(12) United States Patent
McKague, Jr.

(10) Patent No.: US 6,374,570 B1
(45) Date of Patent: Apr. 23, 2002

(54) APPARATUS AND METHOD FOR JOINING DISSIMILAR MATERIALS TO FORM A STRUCTURAL SUPPORT MEMBER

(75) Inventor: Elbert Lee McKague, Jr., Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/648,321

(22) Filed: Aug. 25, 2000

(51) Int. Cl.[7] .................................................. E04B 2/00
(52) U.S. Cl. ............................ 52/762; 52/428; 52/156; 52/189
(58) Field of Search ............................ 52/729.2, 731.7, 52/309.13, 309.16

(56) References Cited

U.S. PATENT DOCUMENTS

| | | | | |
|---|---|---|---|---|
| RE21,921 E | * | 10/1941 | Greulich | ...................... 189/37 |
| 4,177,306 A | * | 12/1979 | Schulz et al. | ................ 428/107 |
| 4,331,495 A | * | 5/1982 | Lackman et al. | .............. 156/93 |
| 5,308,675 A | * | 5/1994 | Crane et al. | ................. 428/120 |

* cited by examiner

Primary Examiner—Carl D. Friedman
Assistant Examiner—Steve Varner
(74) Attorney, Agent, or Firm—Bracewell & Patterson, L.L.P.

(57) ABSTRACT

A preformed component or "preform" for a structural member has a planar base with two longitudinal legs extending in parallel from the base. A channel is defined between the legs for insertion of a flat panel that forms the web of the structural member. The preform is a composite material having continuous filaments of woven or braided fiber. The preform is impregnated with a thermoset resin that bonds the web to the flange of the structural member. The preform provides excellent structural support even if the web and the flange are formed from dissimilar materials such as metallic and composite. The resin is structurally reinforced with oriented fibers in such a manner as to provide coupling strength between the joined members.

24 Claims, 4 Drawing Sheets

APPARATUS AND METHOD FOR JOINING DISSIMILAR MATERIALS TO FORM A STRUCTURAL SUPPORT MEMBER

CROSS-REFERENCE TO RELATED APPLICATIONS

The following U.S. Patent Applications by the same inventor, Elbert L. McKague, Jr. are being simultaneously filed and incorporated herein by reference: U.S. Patent Application entitled "Apparatus And Method For Controlled Damage Of Conformable Materials"; U.S. Patent Application entitled "Composite Structural Panel with Undulated Body"; and by the same inventor together with inventors Ronald P. Schmidt and David T. Uhl, U.S. Patent Application entitled "Composite Material Support Structures With Sinusoidal Webs And Method Of Fabricating Same".

BACKGROUND OF THE INVENTION

1. Technical Field

The present invention relates in general to an improved structural member, and in particular to an improved structural beam, made by joining dissimilar materials. Still more particularly, the present invention relates to a structural composite preform for joining the web of a structure with flanges formed from dissimilar materials.

2. Description of the Prior Art

Structural support spars or I-beams typically have an "I" or "H" shaped cross-section, having a web with a crossbar or flange on each end of the web. The web and flanges extend integrally down the length of the beam, but may vary in shape, thickness, materials, etc. For example, one type of beam has a web formed from a first material (such as a metal) and flanges formed from a second, dissimilar material (such as a composite material). This type of beam has been pursued through a variety of design and manufacturing approaches since these structures offer the potential of providing excellent stiffness and strength-to-weight performance.

Prior approaches to joining dissimilar materials such as metals and composites have generally relied on mechanical fastening if the two elements are at an angle. As shown in FIG. 1, a spar 11 having an inverted T-shaped metal panel 13 with a flange 15 is joined to a flat composite plate 17 with mechanical fasteners 19 such that metal panel 13 and composite plate 17 are perpendicular to each other. In such an arrangement, metal panel 13 must have flange 15 to enable fastening to composite plate 17. Moreover, the necessity of having flange 15 on metal panel 13 adds considerable cost to its fabrication since flange 15 significantly increases the volume of metal that must be purchased and then machined away. In addition, mechanical fastening involves drilling and countersinking holes, installing fasteners and, in some cases, treating the fastener heads to achieve a desired surface smoothness. These steps are expensive and can contribute an additional 25% to 60% to the overall cost of the spar assembly. Thus, an improved apparatus and method for forming a structural support member by joining dissimilar materials at an angle is needed.

SUMMARY OF THE INVENTION

A preformed component or "preform" for a structural support beam has a planar base with two longitudinal legs extending in parallel therefrom. A channel is defined between the legs of the preform, and a flat panel that forms the web of the structural support beam is inserted into the channel. The preform is a composite material having continuous filaments of woven or braided fiber. The preform is impregnated with a thermoset resin that joins and bonds the web to the flange of the structural support beam. The preform provides excellent structural support even if the web and the flange are formed from dissimilar materials such as metal and composite. The resin is structurally reinforced with oriented fibers in such a manner as to provide coupling strength between the joined members.

When a single filament is chosen for the preform, its properties are selected to minimize the difference in thermal expansion coefficients of the metal web and the composite flange. However, the preform may have two or more types of filaments with different properties. The filament in the base of the preform is chosen such that its axial thermal expansion coefficient matches that of the composite flange. The filament in the legs of the preform is chosen such that its axial thermal expansion coefficient matches that of the metal web. These filaments are used in combination to provide coupling strength between the joined metal web and composite flange by having the best structural fiber oriented parallel to the legs of the preform, and by its being interwoven into the base of the preform.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
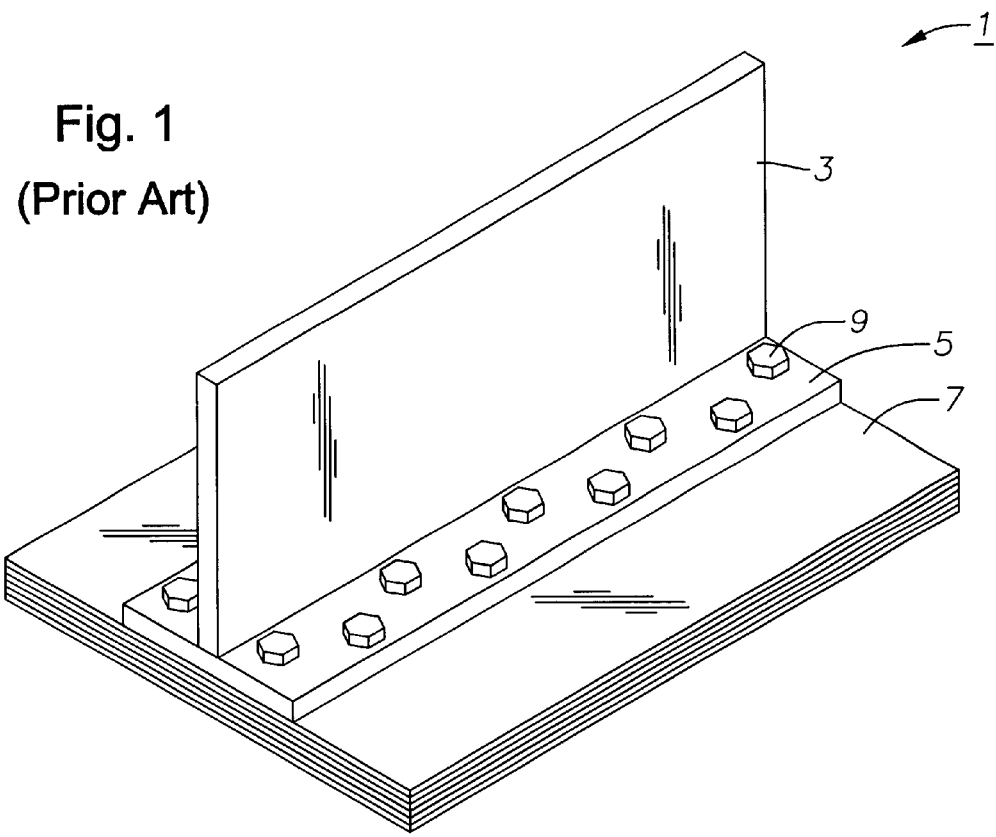
FIG. 1 is an isometric view of a conventional, prior art spar formed from dissimilar materials.
Figure 2:
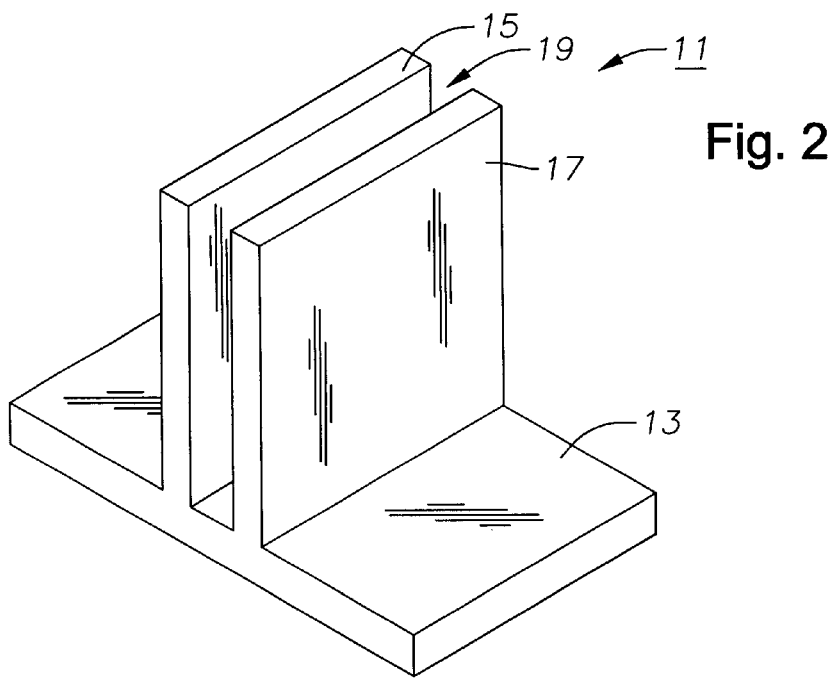
FIG. 2 is an isometric view of a structural preform constructed in accordance with the invention.
Figure 3:
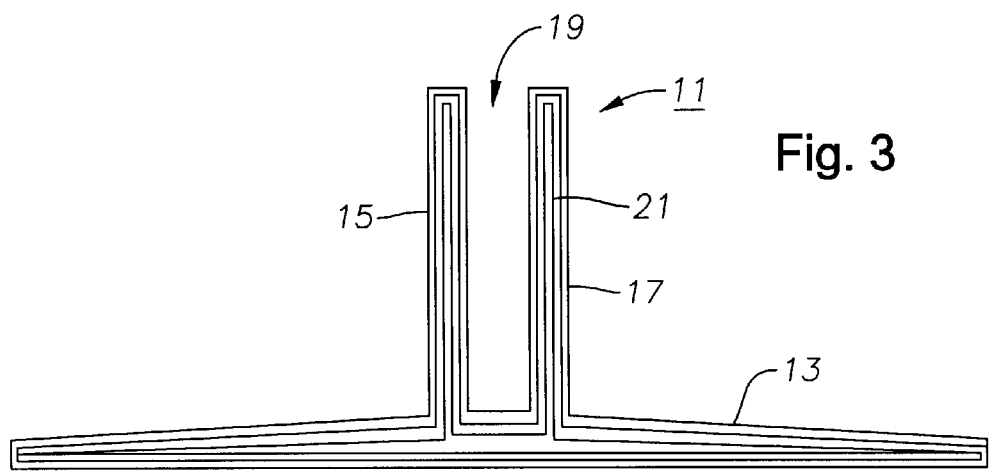
FIG. 3 is a sectional end view of the structural preform of FIG. 2.

Referring to FIGS. 2 and 3, a preformed component or "preform" 11 for a structural support beam is shown. When viewed from the end or in cross-section, preform 11 resembles the Greek letter π or "pi" having a longitudinal crossbar or base 13 with two longitudinal legs 15, 17 extending therefrom. A groove or channel 19 is defined between legs 15, 17. Preform 11 is a composite material that is formed by waving or braiding continuous bundles or tows of structural fibers 21 (FIG. 2). The tows of fibers 21 are oriented to extend continuously throughout each segment of preform 11 including base 13 and legs 15, 17. The fiber preforms may be formed to provide any desired fiber architecture needed to impart chosen load-carrying capability and to accommodate any desired web panel thickness. Preform 11 may be impregnated with a suitable thermoset resin that acts as an adhesive to bond together two dissimilar materials. The resin is structurally reinforced with the filaments and/or fibers oriented in x, y, and z directions in such a manner as to provide coupling strength between the joined members.

Alternatively, preform 11 may be unimpregnated so that resin may be infused at a later step of the overall manufacturing process. In the latter embodiment, preform 11 is constructed by weaving or braiding the filaments in such a way that the process is not inhibited. After curing, preform 11 may be machined as needed by an appropriate method to provide desired edge straightness, smoothness, and dimensional control. Another description of preform 11 is contained in U.S. patent application Ser. No. 09/648,488, and is incorporated herein by reference.

Figure 4:
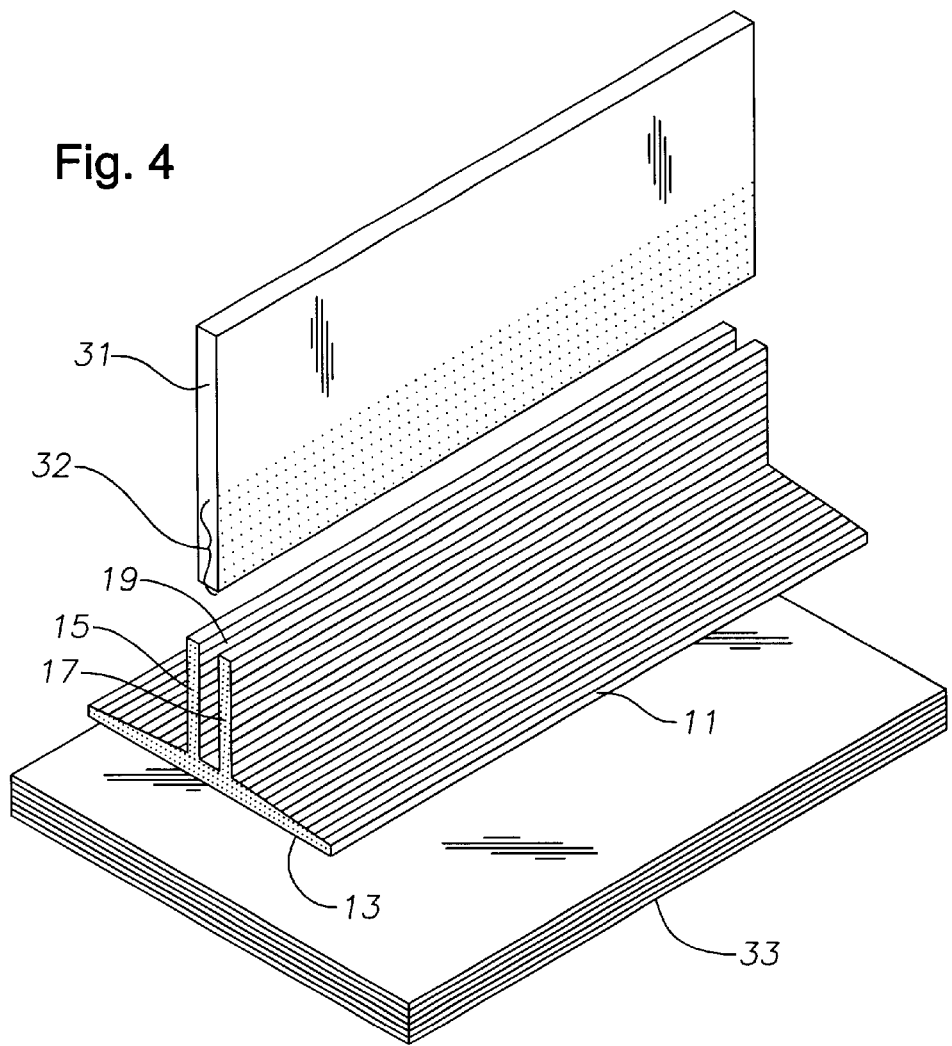
FIG. 4 is an exploded, isometric view of the structural preform of FIG. 2, a composite flange, and a metallic web.
Figure 8:
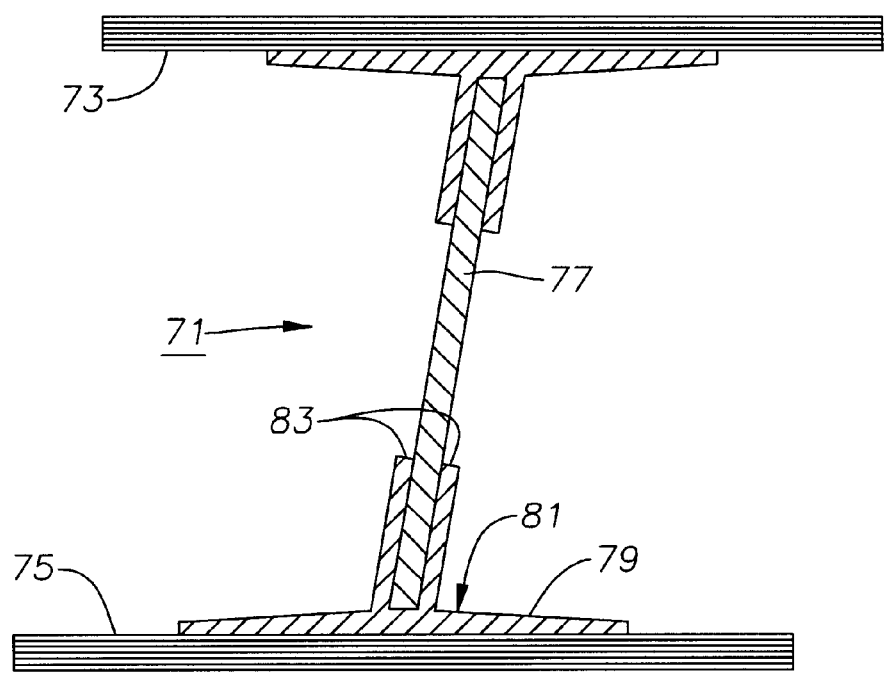
FIG. 8 is an end view of an alternate embodiment of a beam constructed in accordance with the invention.

Referring now to FIG. 4, preform 11 is used to join a flat metallic panel 31 to a flat composite plate 33 at an angle. Metallic plate 31 has a zone 32 that is prepared for bonding to preform 11. Preparation may be any suitable, established method appropriate to the selected metal alloy, such as chemical etching. The composite may also be prepared, in the zone to be mated with the preform, by a suitable method such as removal of a peel ply. In the embodiment shown, metallic panel 31 forms the web of a structural support member, composite plate 33 forms the flange thereof, and the angle is perpendicular. However, composite plate 33 may form the web of the spar with metallic panel 31 as the flange of the spar, and the angle between the members may be acute (see FIG. 8). The members can be joined at other angles relative to each other because the fibrous preform 11 is flexible prior to curing the resin. In FIG. 8, a beam 71 has upper and lower composite flanges 73, 75 that are inclined at a non-orthogonal angle relative to web or metallic panel 77. The bases 79 of the preforms 81 are substantially flat and parallel relative to flanges 73, 75, while the legs 83 of preforms 81 are inclined at the non-orthogonal angle relative to bases 79. These concepts are not limited to I-beam type structural support members, but may be readily adapted for use in beams having other shapes as well, such as U-shaped, C-shaped, L-shaped, or Z-shaped beams, depending on the application.

Figure 5:
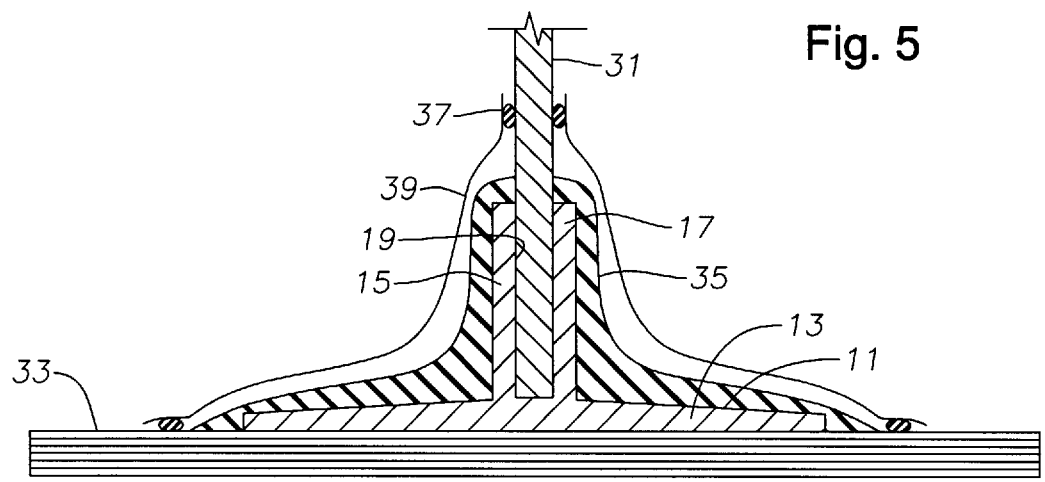
FIG. 5 is a schematic end view of the preform, flange, and web of FIG. 4 during fabrication.

During assembly, one of the longitudinal edges of metallic panel 31 is fully inserted into channel 19 of preform 11 until it bottoms out as shown in FIG. 5 or is appropriately close to bottoming out. The two legs 15, 17 closely receive and straddle the thickness of panel 31. The vertical sides or edges of panel 31 are not attached to preform 11. Next, a composite plate 33 of appropriate thickness, fiber orientation, and geometry is positioned against the base 13 of preform 11 opposite panel 31 to create a crossbar or flange for the structural support member. Composite plate 33 may be either cured or uncured, but in the preferred embodiment of the invention, it is already cured to provide the desired configuration and dimensional tolerances in order to simplify the assembly tooling that is required.

The fastenerless assembly of the metallic and composite elements also may be accomplished via the following steps. (1) The base 13 of the uncured, resin-impregnated preform 11 is placed at the desired joining location onto the base plate or panel (usually composite plate 33) after it has been suitably cleaned or prepared for bonding. (2) Using appropriate fixtures, the metallic panel 31 is placed in channel 19 of uncured preform 11 at the desired angle relative to composite plate 33. (3) Appropriate boundary tooling, such as conventional molded shapes of silicone rubber or other suitable pressure intensifier/transmitter 35 (FIG. 5), is positioned against each side of preform 11. (4) Vacuum bagging materials 39 are placed around the resulting assembly, sealed with sealant beads 37, and a vacuum is pulled under the bag. If the preform was previously unimpregnated, a selected resin is infused therein. (5) The total structure is heated according to a thermal profile suitable for curing the thermosetting resin that impregnates preform 11, thereby creating structural bonds that integrally link preform 11 to metallic panel 31 to create a desired structure. If desired or required, autoclave pressure can be simultaneously applied to provide compaction of preform 11 during cure of the resin. The resin and the maximum cure temperatures are selected to provide a cured glass transition temperature greater than the intended use temperature of the assembly. Alternatively, a resin can be used which has a suitable chemistry, such as free-radical polymerization, so that an energetic beam of electrons can initiate and complete the cure (a process known in the industry as electron beam curing). (6) Following completion of the required cure cycle, the bagging materials and positioning fixtures are removed, yielding a completed assembly.

Figure 7:
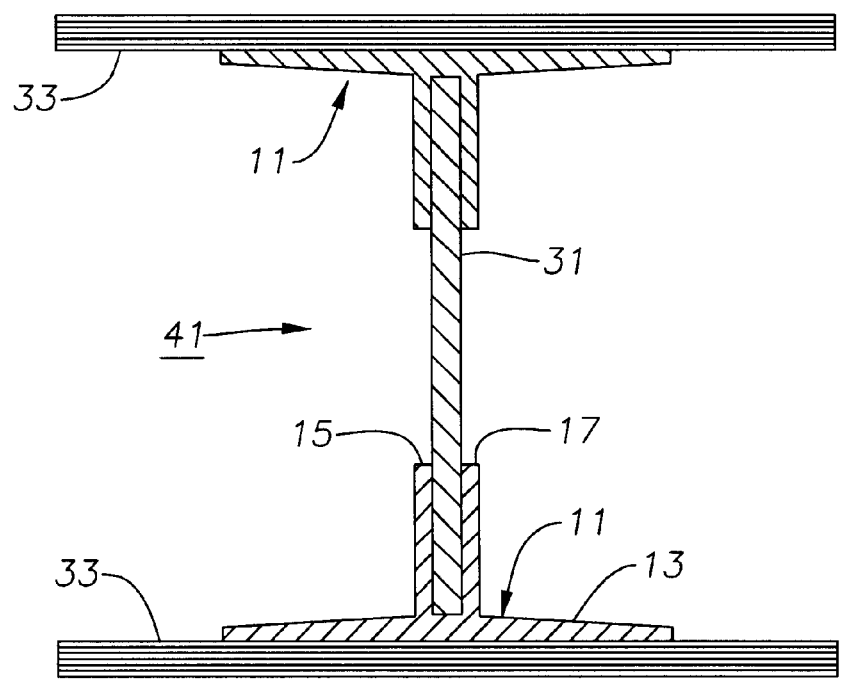
FIG. 7 is an end view of a beam constructed from the components of FIG. 4 in accordance with the invention.

Alternatively, it should be readily apparent to one skilled in the art that all of the curable materials may be uncured at the time of assembly of metallic panel 31, preforms 11, and composite plate 33. After the respective components are assembled and placed in suitable tooling, the resin in preform 11 can be injected in a resin transfer molding type of process, or infused by placing a thick layer of resin over the preform and applying a vacuum bag. Although this reduces the number of cure cycles required, it significantly complicates the assembly cure tooling requirements, thereby increasing both cost and risk. By still another means, a co-bonding of preform 11 with an uncured composite plate 33 can be accomplished. Although the process was described for only one end of panel 31, this series of steps may be performed simultaneously on both ends of panel 31 to form the end product spar or beam 41 (FIG. 7).

Depending upon the actual use temperature of the assembly and the chemistry of the selected resin, it may be necessary to expose the assembly to resin cure temperatures as high as 350 degrees F. At such temperatures, the dimensional growth of each plate or panel 31, 33 is governed by its respective thermal expansion coefficient. An aluminum panel 31, having an expansion coefficient of approximately 12 micro-inch/inch/degree F., will expand by about 3300 micro-inch/inch of length. In contrast, a composite plate 33 formed from carbon fiber impregnated with epoxy resin has negligible expansion. This difference in expansion imparts a significant strain on the joined panel and plate 31, 33, thereby degrading the mechanical performance of the assembly and making it difficult to achieve the desired dimensional control of the assembly because of bowing induced by the thermal mismatch. In the legs 15, 17 of preform 11, an axial fiber having a thermal expansion coefficient much closer to that of aluminum panel 31 would reduce the amount of strain built into the assembly by the curing operation.

Figure 6:
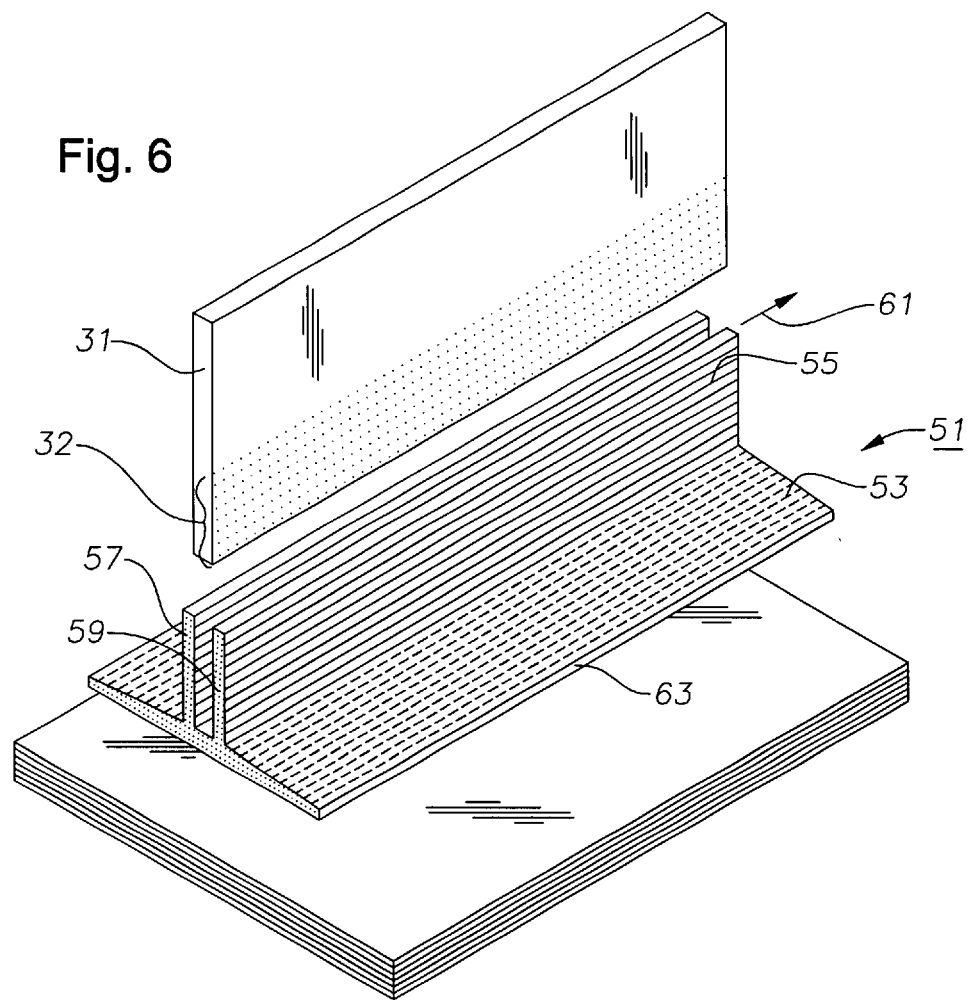
FIG. 6 is an exploded, isometric view of an alternate version of the structure of FIG. 4, a metallic flange, and a composite web.

In FIG. 6, an alternate embodiment depicts a preform 51 having two (or more) types of filaments and/or fibers having different properties. Base filament 53, which is oriented parallel to the length of the preform, is chosen such that its axial thermal expansion coefficient matches that of composite plate 33 as closely as possible. Leg filament 55, which also is oriented parallel to the length of the preform, is chosen such that its axial thermal expansion coefficient matches that of metallic panel 31 having bonding zone 32 as closely as possible. Filaments 53, 55 are used in combination to provide coupling strength to the joined metallic panel 31 and composite plate 33 by being oriented parallel to the legs 57, 59 of preform 51 (in the direction of arrow 61), and by being interwoven into the base 63 of preform 51. The fiber or filament 53 chosen to provide coupling strength is oriented orthogonal to the fiber and/or filaments 55 chosen for thermal expansion characteristics . These orthogonal fibers 53 traverse the width of preform 51, following its shape back and forth in a manner resulting from weaving of woof fibers, i.e., those fibers which are perpendicular to the lengthwise direction of the preform.

The extent and pattern, if any, for blending the two axial fibers 53, 55 in the area where the legs 57, 59 intersect base 63 are determined on an application-specific basis through analysis and/or empirical methods. When a single filament is chosen for preform 51 (FIG. 4), its properties are selected in order to minimize its difference in thermal expansion coefficients with metallic panel 31 and composite plate 33. However, in all cases the filaments are oriented parallel to the axis and continuous length of the preform.

An example of filament or fiber selections would be E-glass® or S-glass® fibers for the axial direction of preform 11, and high strength carbon fibers such as Hexcel AS4® or Toray T300® for the coupling strength direction (parallel to the vertical direction of legs 15, 17). Glass fibers provide a thermal expansion coefficient on the order of 6 micro-inch/inch/degree F., whereas carbon fibers have an expansion coefficient near zero. Thus, glass fibers are a better thermal strain match with aluminum than with carbon fiber. Alternatively, metallic filaments in the axial direction impart a smaller difference in thermal strains between the legs 15, 17 of preform 11 and metallic panel 31. High modulus carbon fibers such as Hexcel IM7® or Amoco T600® may be used for the coupling strength direction, where the total distance over which strain differences are multiplied is very small.

During the cure of the resin, temperature is controlled so that the resin gels at as low a temperature as is practical. This step is followed by a slow rise in temperature to levels necessary to achieve the required glass transition temperature of the cured resin. Gelling the resin at a lower temperature aids the establishment of a stress-free temperature point that is lower than that required to achieve the needed glass transition temperature. The rise in temperature after gellation must be very slow so that resin cross-link density is increased at such a rate that increasing levels of thermally-induced strain does not break down the tender bond. After completing the maximum temperature dwell, cool down preferably occurs at as slow a rate as practical until a temperature is reached that is at least 50 degrees F. lower than the gellation temperature. This slow cool down allows some relaxation to occur in the polymer and helps to preserve the lowest possible stress-free temperature. The difference in stress-free temperature and ambient temperature, multiplied by the difference between thermal expansion coefficient of metallic panel 31 and that of the axial fibers in preform 11, determine the amount of thermally-induced strain in the resulting assembly.

The present invention has several advantages. Woven or braided pi-shaped preforms join metallic and composite plates or panels at angles relative to each other without the use of mechanical fasteners. The preforms provide much greater strength than conventional adhesive bonding techniques while simplifying and reducing the cost of manufacturing. The present invention does not require drilling, countersinking, fastener installation, or fastener head treatments. Whereas mechanical fastening involves incremental work progressing along the joint length, the present invention treats the entire joint in one step. This enables a very large reduction of 20% to 55% in the total cost of the assembly. In addition, the present invention is also lighter in weight than prior art solutions because the resin-impregnated preform weighs less than the number of fasteners that would be required to provide an equivalent strength joint. Moreover, the metallic member can be a flat plate or panel without a flange, thereby significantly reducing the cost of fabricating the metal detail for many complex, high performance structures such as those used for aircraft.

While the invention has been shown or described in only some of its forms, it should be apparent to those skilled in the art that it is not so limited, but is susceptible to various changes without departing from the scope of the invention.

What is claimed is:

1. A structural member, comprising:
    a web formed from one of a metallic material and a composite material, the web having a pair of longitudinal edges extending in an axial direction;
    a flange formed from the other of the metallic and composite materials;
    a preform formed from composite materials and having a base with a pair of axially elongated legs extending therefrom to define a channel therebetween, wherein the preform is formed from filaments that extend through the base and legs; and wherein
    one of the longitudinal edges of the web is bonded in the channel of the preform and the flange is bonded to a surface of the base of the preform.

2. The structural member of claim 1 wherein the axial filaments minimize a difference in thermal expansion coefficients of the web and the flange.

3. The structural member of claim 1 wherein the preform has a pi-shaped cross-section.

4. The structural member of claim 1 wherein the axial filaments are oriented parallel to an axial, continuous length of the preform.

5. The structural member of claim 1 wherein the flange and the base of the preform are inclined at a non-orthogonal angle relative to the web.

6. The structural member of claim 1 wherein the preform is impregnated with a thermoset resin that acts as an adhesive to bond together the web and the flange.

7. The structural member of claim 6 wherein the resin is structurally reinforced with fibers to provide coupling strength between the web and the flange.

8. The structural member of claim 1 wherein the preform has a first type of axial filament in the base, and a second type of axial filament in the legs.

9. The structural member of claim 8 wherein the first and second types of axial filaments are blended in an area where the legs intersect the base.

10. The structural member of claim 8 wherein the first type of axial filament has an axial thermal expansion coefficient that substantially matches an axial thermal expansion coefficient of the flange, and wherein the second type of axial filament has an axial thermal expansion coefficient that substantially matches an axial thermal expansion coefficient of the web.

11. A structural member, comprising:
   a web formed from one of a metallic material and a composite material, the web having a pair of longitudinal edges extending in an axial direction;
   a flange formed from the other of the metallic and composite materials;
   a generally pi-shaped preform formed from composite materials and having a base with a pair of axially elongated legs extending therefrom to define a channel therebetween, the preform being formed from axial filaments that extend through the base and legs, wherein the axial filaments are oriented parallel to the axial direction and a continuous length of the preform, and the axial filaments minimize a difference in thermal expansion coefficients of the web and the flange; and wherein
   one of the longitudinal edges of the web is bonded in the channel of the preform and the flange is bonded to a surface of the base of the preform.

12. The structural member of claim 11 wherein the flange and the base of the preform are inclined at a non-orthogonal angle relative to the web.

13. The structural member of claim 11 wherein the preform is impregnated with a thermoset resin that acts as an adhesive to bond together the web and the flange.

14. The structural member of claim 13 wherein the resin is structurally reinforced with fibers to provide coupling strength between the web and the flange.

15. The structural member of claim 11 wherein the preform has a first type of axial filament in the base, and a second type of axial filament in the legs, and wherein the first and second types of axial filaments are blended in an area where the legs intersect the base.

16. The structural member of claim 15 wherein the first type of axial filament has an axial thermal expansion coefficient that substantially matches an axial thermal expansion coefficient of the flange, and the second type of axial filament has an axial thermal expansion coefficient that substantially matches an axial thermal expansion coefficient of the web.

17. A method for fabricating a structural member, comprising the steps of:
   (a) providing a web formed from one of a metallic material and a composite material and having a longitudinal edge extending in an axial direction, and a flange formed from the other of the metallic and composite materials;
   (b) forming a preform from composite materials, the preform having a base with a pair of legs extending therefrom to define a channel therebetween, wherein the preform has filaments that extend through the base and the legs;
   (c) positioning boundary tooling on the preform, web, and flange and heating the structural member;
   (d) bonding the longitudinal edge of the web in the channel of the preform such that the legs of the preform closely receive the web; and
   (e) bonding the base of the preform to the flange to form a structural member.

18. The method of claim 17 wherein steps (d) and (e) comprises heating the web, flange, and preform to create structural bonds therebetween.

19. The method of claim 17, further comprising the step of impregnating the preform with a thermoset resin.

20. The method of claim 17 wherein the preform of step (b) is unimpregnated, and further comprising the step of infusing or injecting the unimpregnated preform with resin.

21. The method of claim 17, further comprising the step of applying autoclave pressure to provide compaction of the preform.

22. The method of claim 17, further comprising the step of curing said one of the web and the flange formed from the composite material.

23. The method of claim 17 wherein step (c) comprises placing a sealed pressure intensifier over the preform inside a vacuum bag.

24. The method of claim 17, further comprising the step of inclining the web of the preform at a non-orthogonal angle relative to the flange and the base of the preform.

* * * * *